United States Patent [19]
Naramoto

[11] Patent Number: 4,537,411
[45] Date of Patent: Aug. 27, 1985

[54] VEHICLE BODY POSITION CONTROL SYSTEM

[75] Inventor: Yuichi Naramoto, Chiryu, Japan

[73] Assignee: Aisin Seiki Kabushiki Kaisha, Kariya, Japan

[21] Appl. No.: 531,746

[22] Filed: Sep. 13, 1983

[30] Foreign Application Priority Data

Sep. 13, 1982 [JP] Japan .................. 57-159081

[51] Int. Cl.³ .............................................. B60G 9/00
[52] U.S. Cl. .................................................... 280/6 R
[58] Field of Search ........................................ 280/6 R

[56] References Cited

U.S. PATENT DOCUMENTS 2,616,713  11/1952  Schofield ............................ 280/6 R
3,768,820  10/1973  Yew .................................... 280/6 R Primary Examiner—Richard A. Bertsch
Attorney, Agent, or Firm—Oblon, Fisher, Spivak, McClelland & Maier

[57] ABSTRACT

A vehicle body position control system which includes a first and second actuator operated by a pressurized fluid for generating vertical movement of the body vehicle, a compressor for supplying the pressurized fluid to the first and second actuators, a fluid passage interconnecting the compressor and the actuators, a dryer having a desiccating agent therein and positioned within the fluid passage between the compressor and the actuators, a branch passage leading from the fluid passage between the compressor and the dryer, a first solenoid valve positioned within the branch passage, a control mechanism for controlling operation of the first solenoid valve and the compressor, and second and third solenoid valves in communication with the fluid passage between the dryer and the first and second actuators and operated respectively via the control mechanism after a predetermined time delay period subsequent to operation of the first solenoid valve, for thereby releasing pressurized fluid within the actuators to the atmosphere through the dryer.

4 Claims, 3 Drawing Figures

VEHICLE BODY POSITION CONTROL SYSTEM

BACKGROUND OF THE INVENTION

1. Field of the Invention

The present invention relates to vehicle body position control systems and, more particularly, to a vehicle body position control system having a plurality of actuators which are operated by pressurized air to thereby cause vertical movement of the vehicle body.

2. Description of the Prior Art

Various vehicle body position control systems have been proposed which include actuators which are operated by pressurized air to thereby cause vertical movement of a vehicle body, a compressor which supplies pressurized air to the actuators, a dryer having a desiccating agent therein and which is positioned within a fluid passage between the compressor and the actuators, a solenoid valve which is positioned within a branch passage from the fluid passage to permit pressurized air within the actuators to be released to the atmosphere through the dryer, and control means which controls the operation of the solenoid valve and the compressor. In such known vehicle body position control systems, a silica gel is generally used as a desiccating agent within the dryer and maintenance free utilization of such silica gel is desired. Therefore, an orifice is positioned at a port portion of the dryer, which is at one side of the actuators, so as to thereby decrease the pressure within the dryer when the pressurized air within the actuators is released. Thus, the discharge of moisture within the silica gel is improved.

However, in such control systems, the supply and release of the pressurized air, respectively, to and from the actuators is delayed due to the arrangement of the orifice and, therefore, a much greater time period in controlling the vehicle body position than desired may be required. Furthermore, loss of pressure may even occur due to the arrangement of the orifice when the pressurized air is supplied to the actuators.

SUMMARY OF THE INVENTION

Therefore, it is an object of the present invention to provide a new and improved vehicle body position control system which obviates the above-mentioned prior art drawbacks.

Another object of the present invention is to provide a new and improved vehicle body position control system wherein the effective discharge of moisture from a desiccating agent is improved and the vehicle body position is quickly controlled.

Still another object of the present invention is to provide a new and improved vehicle body position control system wherein the possibility of experiencing a loss of the pressure while supplying pressurized air to the actuators is substantially reduced.

It is yet a further object of the present invention to provide a new and improved vehicle body position control system which is simple in construction and low in cost.

According to the present invention, a vehicle body position control system comprises a plurality of actuators which are operated by pressurized air to thereby cause vertical movement of a vehicle body, a compressor which supplies pressurized air to the actuators, a dryer having a desiccating agent therein and which is positioned within a fluid passage between the compressor and the actuators, a first solenoid valve positioned within a branch passage from the fluid passage, between the compressor and the dryer, for releasing pressurized air within the actuators to the atmosphere through the dryer, control means which controls the operation of the first solenoid valve and the compressor, and second solenoid valve means positioned within the fluid passage between the dryer and the actuators and operated by the control means controlling the operation of the first solenoid valve. Thus, during such time until the second solenoid valve means is opened after the first solenoid valve means is opened, the pressure within the dryer is decreased.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
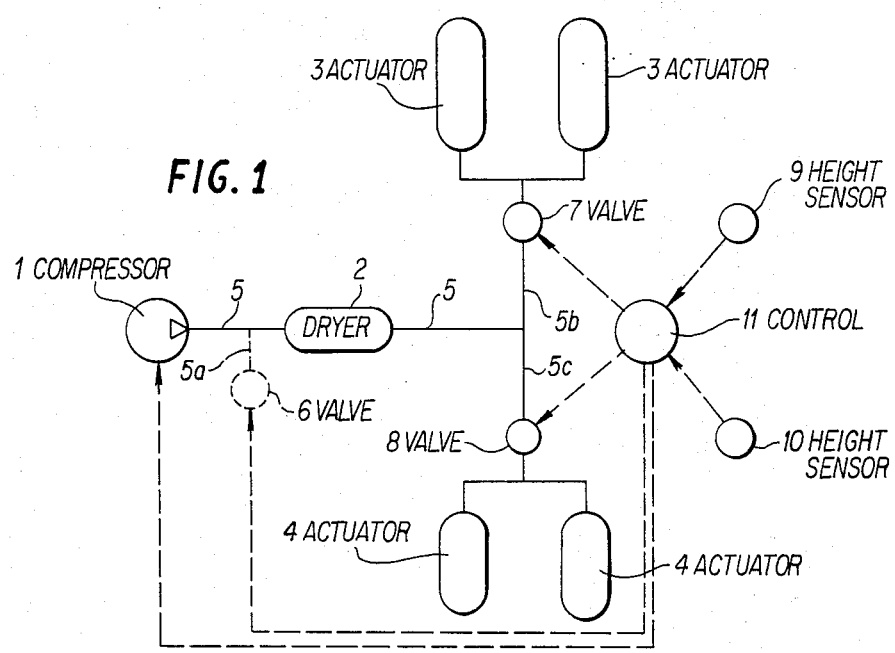
FIG. 1 is a schematic view showing a vehicle body position control system according to the present invention.

Referring to FIG. 1, a vehicle body position control system according to the present invention comprises an electric-powered compressor 1, a dryer 2, front actuators 3,3 of an air spring absorber type, rear actuators 4,4 of an air spring absorber type, an air passage 5 between the compressor 1 and the actuators in which the dryer 2 is located, a first normally-closed solenoid-operated valve 6 in a branch passage 5a leading from passage 5, second normally-closed solenoid-operated valves 7 and 8, respectively for the front and rear ends of the vehicle, being located in branch passages 5b and 5c, respectively, a front vehicle body height sensor 9, a rear vehicle body height sensor 10 and control means 11 including a computer. The control means 11 receives electric signals from the sensors 9 and 10 and delivers electric signals to the compressor 1 and the solenoid-operated valves 6, 7 and 8 for controlling the operations thereof.

When the vehicle body height of the front end of the vehicle is lower than a standard predetermined height, the compressor 1 is brought into operation and the solenoid-operated valve 7 is also brought into an open position by means of electric signals delivered from the control means 11. Therefore, the actuators 3,3 receive pressurized air from the compressor 1 through the passages 5, 5b to thereby cause the vehicle body height of the front end to rise. Similarly, when the vehicle body height of the rear end of the vehicle is lower than the standard predetermined height, the compressor is brought into operation and the solenoid-operated valve 8 is also brought into an open position by means of electric signals delivered from the control means 11. Thus, the actuators 4,4 receive pressurized air through the passages 5, 5c to thereby cause the vehicle body height of the rear end to rise. On the other hand, when the vehicle body height of the front end of the vehicle is higher than the standard predetermined height, the solenoid- operated valves 6 and 7 are brought into open positions by means of the electric signals delivered from the control means 11 so that the pressurized air within the actuators 3,3 is released into the atmosphere through passages 5$b$, 5, the dryer 2, passage 5$a$ and valve 6. As a result, the vehicle body height of the front end is lowered. Similarly, when the vehicle body height of the rear end of the vehicle is higher than the standard predetermined height, the solenoid-operated valves 6 and 8 are brought into their open positions by means of electric signals delivered from the control means 11 so that the pressurized air within the actuators 4,4 is released to the atmosphere through passages 5$c$, 5, the dryer 2, passage 5$a$ and valve 6. As a result, the vehicle body height of the rear end is lowered. As will be apparent above, the vehicle body height of the front end and the vehicle body height of the rear end are independently controlled, respectively.

Figure 2:
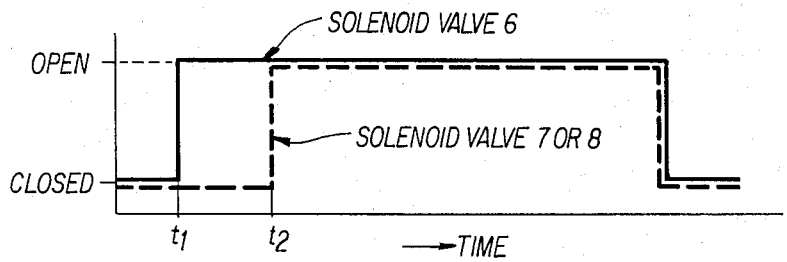
FIG. 2 is a time chart showing operation of the first solenoid valve and the second solenoid valve means, as used in the system in FIG. 1.

In releasing the pressurized air from within the actuators 3,3 and 4,4, the solenoid-operated valves 6, 7 and 8 are operated by means of the control means 11, as shown in FIG. 2. More particularly, the solenoid-operated valve 6 is initially brought into an open position at a time $t_1$ and thereafter one of the solenoid-operated valves 7 or 8 is brought into an open position at a time $t_2$. In other words, the solenoid-operated valves 7 or 8 are brought into their open positions after a time delay of $(t_2-t_1)$ following the solenoid-operated valve 6 being brought into its open position. This may be easily computed by the control means 11 which includes a timer circuit (not shown) acting as a delay means to thereby discontinue sending the electric signal, causing the respective solenoid-operated valve 7 or 8 to open the predetermined time $(t_2-t_1)$ after the electric signal which causes the solenoid-operated valve 6 to open is sent.

Figure 3:
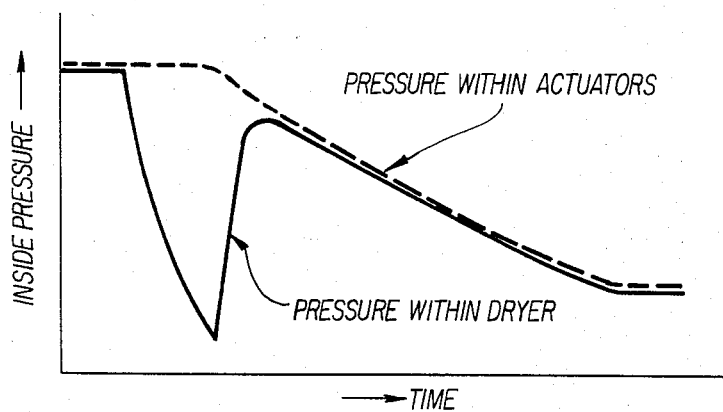
FIG. 3 is a time chart showing changes in the pressure within the dryer as shown in the system in FIG. 1.

As will be apparent in FIG. 3, showing changes in the pressures within the dryer 2 and the actuators when the solenoid-operated valves 6, 7 and 8 are operated as shown in FIG. 2, the pressure within the dryer 2 is greatly decreased during the time delay $(t_2-t_1)$ so that the moisture which is absorbed in the desiccating agent, such as a silica gel disposed within the dryer 2, is at least nearly completely evaporated. Thus, the moisture is released into the atmosphere together with the pressurized air within the actuators 3,3 or 4,4, which are drained to the dryer 2 when the solenoid-operated valves 7 or 8 are brought into their open positions. The desiccating agent may now be reclaimed in accordance with this invention.

The vehicle body height of the front end and the vehicle body height of the rear end may be controlled dependently.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle body position control system, comprising:

first and second actuator means operated by a pressurized air for generating vertical movement of said vehicle body;

air compressor means for supplying said pressurized air to said first and second acutator means;

air passage means interconnecting said compressor means and said first and second actuator means;

air dryer means, including a desiccating agent disposed therein, being positioned within said air passage means between said compressor and said first and second actuator means;

said air passage means having a first branch passage leading therefrom between said compressor means and said dryer means, said first branch communicating with the atmosphere;

first solenoid valve means positioned within said first branch passage;

second solenoid valve means in said air passage means between said dryer means and at least one of said first and second actuator means;

control means for controlling operation of said first and second solenoid valve means and said compressor meand, said control means including delay means for opening said second solenoid valve means with a delay of a predetermined time after opening said first solenoid valve means, to thereby release said pressurized air within said at least one of said first and seocnd actuator means into the atmosphere through said dryer means.

2. A vehicle body position control system as set forth in claim 1, further comprising at least one height sensor means in communication with said control means for generating a signal to said control means in response to a measured height of said vehicle body which differs from a set predetermined height.

3. A vehicle body position control system as set forth in claim 2, wherein said second solenoid valve means comprises a vehicle front end solenoid valve and a vehicle rear end solenoid valve.

4. A vehicle body position control system as set forth in claim 3, wherein said at least one height sensor further comprises a vehicle front end height sensor and a vehicle rear end height sensor.

* * * * *

UNITED STATES PATENT AND TRADEMARK OFFICE
CERTIFICATE OF CORRECTION

PATENT NO. : 4,537,411
DATED : August 27, 1985
INVENTOR(S) : Yuichi Naramoto

It is certified that error appears in the above-identified patent and that said Letters Patent is hereby corrected as shown below:

Column 4, line 15, change "acutator" to --actuator--;

Column 4, line 33, change "meand" to --means--;

Column 4, line 37, change "seocnd" to --second--.

Signed and Sealed this

Fourteenth Day of January 1986

[SEAL]

Attest:

DONALD J. QUIGG

Attesting Officer

Commissioner of Patents and Trademarks